Aug. 10, 1943.  W. R. WEEKS  2,326,589
APPLIANCE CONSTRUCTION
Filed June 10, 1942
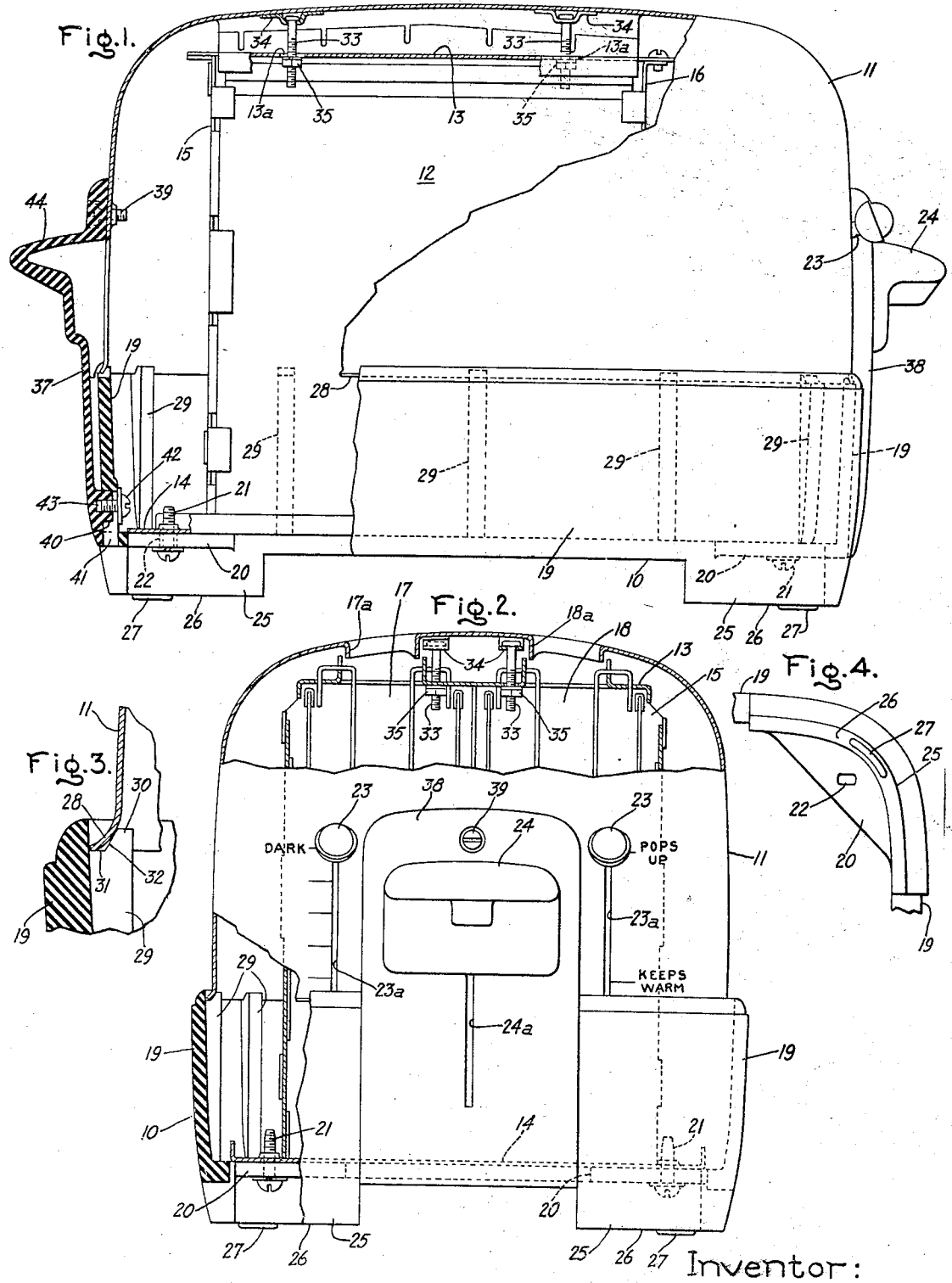
Inventor:
Walter R. Weeks,
by Harry E. Dunham
His Attorney.

Patented Aug. 10, 1943

2,326,589

UNITED STATES PATENT OFFICE 2,326,589

APPLIANCE CONSTRUCTION

Walter R. Weeks, Hamden, Conn., assignor to General Electric Company, a corporation of New York Application June 10, 1942, Serial No. 446,431

3 Claims. (Cl. 53—5)

The present invention relates to an appliance construction and more particularly to an improved casing construction for an appliance such as an automatic bread toaster.

In the manufacture of casings for electric bread toasters, it has heretofore been customary to form an enclosing shell of sheet metal, the shell being formed by fabrication of a number of separate preformed pieces. Such a method of construction is costly and the resulting structure has the disadvantage that the joints between the parts of the shell tend to be unsightly and to render the cleaning of the shell difficult because of the tendency of foreign material to lodge in the joints.

It is an object of the present invention to provide a casing for an appliance, such as an automatic bread toaster, comprising a one-piece metal shell which can be easily and quickly formed by a simple pressing operation.

It is a further object of my invention to provide an appliance casing which is simple in construction, easily assembled, and attractive in appearance.

Further objects and advantages of my invention will become apparent as the following description proceeds and the features of novelty which characterize my invention will be pointed out with particularity in the claims annexed to and forming a part of the specification.

In the casing construction disclosed in this application, the shell is formed of a single piece of sheet metal which is shaped by a suitable pressing operation. This construction has brought about manufacturing difficulties which were not present in the prior construction in which the shell was fabricated from a number of preformed pieces. Thus, with the usual dies available, it is not possible to press out a one-piece shell having sufficient depth to completely enclose a bread toaster of standard size. This difficulty is overcome by utilizing a molded plastic base having vertically extending side walls which enclose the lower portion of the toaster assembly and extend upwardly a sufficient distance to effect a junction with the bottom of the one-piece metal shell. This construction overcomes the difficulty mentioned above and has the additional advantage that less metal is required in the manufacture of the toaster.

In the construction described above, a problem was encountered in providing a joint between the side walls of the molded base member and the bottom of the metal shell which would permit a rapid assembly, which would not be unsightly, and which would not in any way interfere with the cleaning of the toaster shell. According to the present invention, this difficulty is solved by telescoping the bottom portion of the shell into the opening formed by the closed side walls of the base member and providing grooved supporting means for the shell which extend inwardly from the side walls of the base. This renders the joint invisible from the exterior of the casing.

In the construction described above, a second difficulty was encountered due to unavoidable variation in the sizes of the metal shells and the molded bases. This caused difficulty in securing a proper fit between the shell and the base. According to another aspect of the present invention, this difficulty is overcome by shaping the grooved supporting means that receives the bottom edge of the shell so that as the base and the shell are drawn together in the final assembling operation, the bottom of the shell is forced outwardly against the inner surface of the side walls of the base member whereby the periphery of the lower portion of the shell is made to conform uniformly with the contour of the side walls.

Another difficulty that was encountered in manufacturing the casing was the fact that the molded bases have a tendency to rock when placed on a flat surface. This is caused by unavoidable irregularities in the molding of the base. According to another aspect of the present invention, this problem is solved by the provision of small supplemental feet which are molded integrally on the bottom surface of the main supporting legs. These supplemental feet can be easily ground or polished off to level the base.

My invention will be better understood by reference to the following description taken in connection with the accompanying drawing of which Fig. 1 is a side elevation, partly in section, of an electric bread toaster embodying my invention; Fig. 2 is an end view of the toaster construction shown in Fig. 1; Fig. 3 is an enlarged detail view showing the construction of the joint between the bottom of the shell and the upper portion of the base; and Fig. 4 is a bottom view of one of the supporting legs of the base.

Referring to the drawing, I have shown an automatic electric bread toaster comprising a base member 10, a one-piece sheet metal enclosing shell 11, and an assembly 12 constituting a toaster mechanism. The toaster mechanism 12 forms no part of the present invention and, therefore, only general outlines of the mechanism have been shown. While the form of the toaster mechanism is immaterial to the present invention, the mechanism is preferably of the type disclosed and claimed in a copending application of Heber L. Newell, Serial No. 414,129, filed October 8, 1941 and assigned to the assignee of the present invention. For an understanding of the present invention, it is deemed sufficient to state that the chassis of the toaster mechanism comprises upper and lower horizontal frame members 13 and 14 which are interconnected by side frame members 15 and 16. These frame members together with other associated parts, the construction of which is immaterial to the present invention, define bread toasting chambers 17 and 18 which are spaced apart crosswise of the toaster and into which slices of bread may be inserted through bread receiving openings 17a and 18a in the shell 11.

The base member 10 is preferably molded as a unitary piece and is made of some suitable, moldable, heat insulating material such as a phenolic condensation product. The body portion of the base is rectangular in shape and comprises vertically extending closed side walls 19 which enclose the lower portion of the toaster mechanism 12. Extending across the corners of the base are molded ledges 20 on which are mounted the frame member 14 of the toaster mechanism. It will be understood that the frame member 14 is rectangular in shape and is of such size that each corner will rest upon and be supported by one of the ledges 20. The frame member 14 is secured to the base by suitable bolts 21 which extend upwardly through elongated openings 22 in the ledges 20, the upper end of the bolts being received in threaded holes in the frame member 14. The elongated shape of the openings 22 permits the chassis to be adjusted relative to the base so that the control levers 23 and the operating handle 24, which are connected to the chassis and which project out through slots 23a and 24a, can be adjusted relative to the slots to obtain proper operation thereof.

Extending downwardly from the base member 10 are four supporting legs 25 which terminate in substantially horizontal flat surfaces 26. The legs 25 are molded integrally with the base 10 and, due to irregularities in the molding operation, it frequently happens that the surfaces 26 will not all lie flat on a flat supporting surface and as a result the base tends to rock. In order to overcome this difficulty, curved supplemental feet 27 are molded on the bottom surfaces 26 of the supporting legs 25. It will be noted that the supplemental feet 27 have a small cross-sectional area as compared to the supporting legs 25 and, because of this fact, they may easily be either wholly or partially removed by a simple abrading operation such as sanding. The provision of the supplemental feet 27 makes it possible to level the base 10 by simply placing the base in an upright position on a flat piece of abrasive material, such as sandpaper, and moving the base relative to the sandpaper while applying pressure. This operation grinds off the high points on the supplemental feet 27 so that the base will sit in a stable level position. Due to the fact that the supplemental feet 27 are curved and have small area in contact with a smooth supporting surface, such as a table top, on which the toaster may be placed, they tend to prevent scratching when the toaster is moved about.

The shell 11 is formed of one piece of a bendable, sheet-metal material, such as steel, by a suitable pressing operation. It will be noted that the bottom edge 28 of the shell is flared outwardly. This flare is necessary in a case where it is desired to press out and to trim the edge of the shell in a single operation as will be understood by those skilled in the art.

In order to form an invisible joint between the side walls 19 of the molded base member and the bottom of the metal shell, the relative sizes of the base member and the shell are made such that the bottom of the shell can be telescoped into the base member so that the bottom edge of the shell is hidden by the side walls 19.

For the purpose of supporting the lower edge 28 of the shell on the base member, a plurality of ribs 29 are provided which extend inwardly from the inner surface of the walls 19. As best shown in Fig. 3 of the drawing, the upper portion of each rib 29 is provided with a projection 30 which extends upwardly in spaced relation with the inner surface of the side walls 19 so as to form a groove 31. The groove 31 is adapted to receive the lower flared edge 28 of the shell as illustrated. The supporting ribs 29 are, of course, invisible from the exterior of the casing so that the joint between the shell and the base is completely hidden from view.

It will be understood that instead of utilizing a plurality of separate ribs 29 for supporting the shell a single inwardly extending continuous ledge could be provided in which a continuous groove could be placed. However, I prefer to use separate ribs because it facilitates the molding of the base.

In order to insure that the bottom edge of the shell will conform uniformly to the contour of the side walls 19, the edge 32 of the groove 31 is sloped downwardly and outwardly, as clearly shown in Fig. 3 of the drawing. Therefore, it will be clear that when the lower edge 28 of the shell is forced down into the groove 31, it will be forced outwardly into contact with the inner surfaces of the side walls 19. This insures a uniform joint completely around the periphery of the shell so that the toaster casing will have a neat appearance.

As pointed out before, the chassis of the toaster mechanism is fastened to the base by means of the bolts 21. In order to provide means for drawing together the shell and the base in the final assembly operation, bolts 33 are provided which extend between the under surface of the top of the shell and the top frame member 13. The heads of the bolts 33 are secured to the shell by means of U-shaped straps 34 which are fastened to the under surface of the shell preferably by welding. The middle portion of each strap is provided with a hole through which the bolt extends. The bolts also pass through holes 13a in the frame member 13 and by tightening nuts 35 located on the opposite side of the frame member 13, the shell can be drawn down to proper position on the base member. The holes 13a are elongated to allow adjustment of the shell relative to the chassis and this permits the chassis to align itself on the base during the tightening operation. The holes in the straps 34 through which the bolts 33 extend are made sufficiently large so that the bolts are free to wobble for easy entrance in holes 13a.

Attached to opposite ends of the casing are molded end pieces 37 and 38. The top portions of the molded pieces are secured to the shell 11 by means of screws 39 which extend through threaded openings in the shell. In order to provide invisible means for securing the bottom portions of the end pieces to the molded base, inwardly extending bosses 40 are molded integrally with the end pieces. The bosses on the end piece 38 are not shown, but it will be understood that they are the same as shown on the end piece 37. The boss 40 (Fig. 1) extends through an elongated opening 41 in one of the side walls 19. To fasten the end piece a self-tapping screw 42, backed by a suitable washer, extends through the opening 41 into a cored hole 43 in the boss 40. The elongated opening 41 permits adjustment of the end pieces so that a proper fit is obtained. The end piece 37 has a handle portion 44 molded integrally therewith which, together with the control handle 24, provides convenient means for lifting the toaster.

In assembling the toaster, the chassis 12 is placed into the base member and bolted in place. The shell 11 is then placed over the top of the chassis so that the edge 28 fits into the groove 31. The nuts 35 are then screwed on to the bolts 33 whereby the lower edge 28 of the shell is forced against the inner surfaces of the side walls 19 so that the shell uniformly fits in the molded base and makes a neat appearance. The end pieces 37 and 38 which have been previously fastened to the base are then secured to the shell by screws 39 and the assembly is complete.

From the foregoing, it will be apparent that I have provided a toaster casing which consists of a minimum number of parts and which can be easily assembled. Due to the fact that the shell is formed of one piece, it is smooth over its entire surface and can be easily kept clean during use. Furthermore, the smooth surface enhances the appearance of the shell. It will also be observed that the construction has the advantage that the means for fastening the shell to the base is not apparent from the exterior of the casing. This feature not only improves the appearance of the casing but also tends to discourage disassembly of the toaster by those not competent to do so and thereby safeguards the toaster mechanism.

While I have shown and described a particular embodiment of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A casing construction for an appliance comprising a shell shaped to form an enclosure open at the bottom, a base member comprising vertically extending closed side walls shaped to define an opening into which the bottom of said shell is received in telescoping relation so that the bottom edge of said shell is hidden by said walls, supporting means extending inwardly from the inner surface of said side walls, said supporting means being shaped to define a groove adapted to receive and support the lower edge of said shell, and means for drawing together said shell and said base member, said groove having a surface sloping downwardly and outwardly so that when said base member and said shell are drawn together the lower edge of said shell is forced outwardly against the inner surface of said side walls whereby the periphery of the lower portion of said shell is made to conform to the contour of said side walls.

2. A casing construction for an appliance having an operating assembly housed by the casing comprising a unitary base member formed of a molded heat insulating material having side walls extending vertically so as to enclose the lower portion of said assembly, a one-piece metal shell having an open bottom and being shaped to fit over the upper portion of said assembly and form with said base member an enclosing casing for said assembly, the bottom of said shell extending into said base member on the inside of said walls a sufficient distance to hide the joint therebetween, supporting means extending inwardly from the inner surface of said side walls, said supporting means being shaped to define a groove adapted to receive and support the lower edge of said shell, and loosely mounted means extending between the top of said assembly and the under surface of the top of said shell for drawing together said shell and said base member, said groove having a surface sloping downwardly and outwardly so that when said base member and said shell are drawn together the bottom edge of said shell is forced outwardly against the inner surface of said side walls whereby the periphery of the lower portion of said shell is made to conform with the contour of said side walls.

3. A casing construction for an appliance comprising a shell shaped to form an enclosure open at the bottom, a base member comprising vertically extending closed side walls shaped to define an opening into which the bottom of said shell is received in telescoping relation so that the bottom edge of said shell is hidden by said walls, supporting means within said base adjacent said side walls shaped to define with said side walls a groove adapted to receive and support the lower edge of said shell, and means for drawing together said shell and said base member, said groove having a surface sloping downwardly and outwardly so that when said base member and said shell are drawn together the lower edge of said shell is forced outwardly against the inner surface of said side walls whereby the periphery of the lower portion of said shell is made to conform to the contour of said side walls.

WALTER R. WEEKS.